UNITED STATES PATENT OFFICE 2,000,043

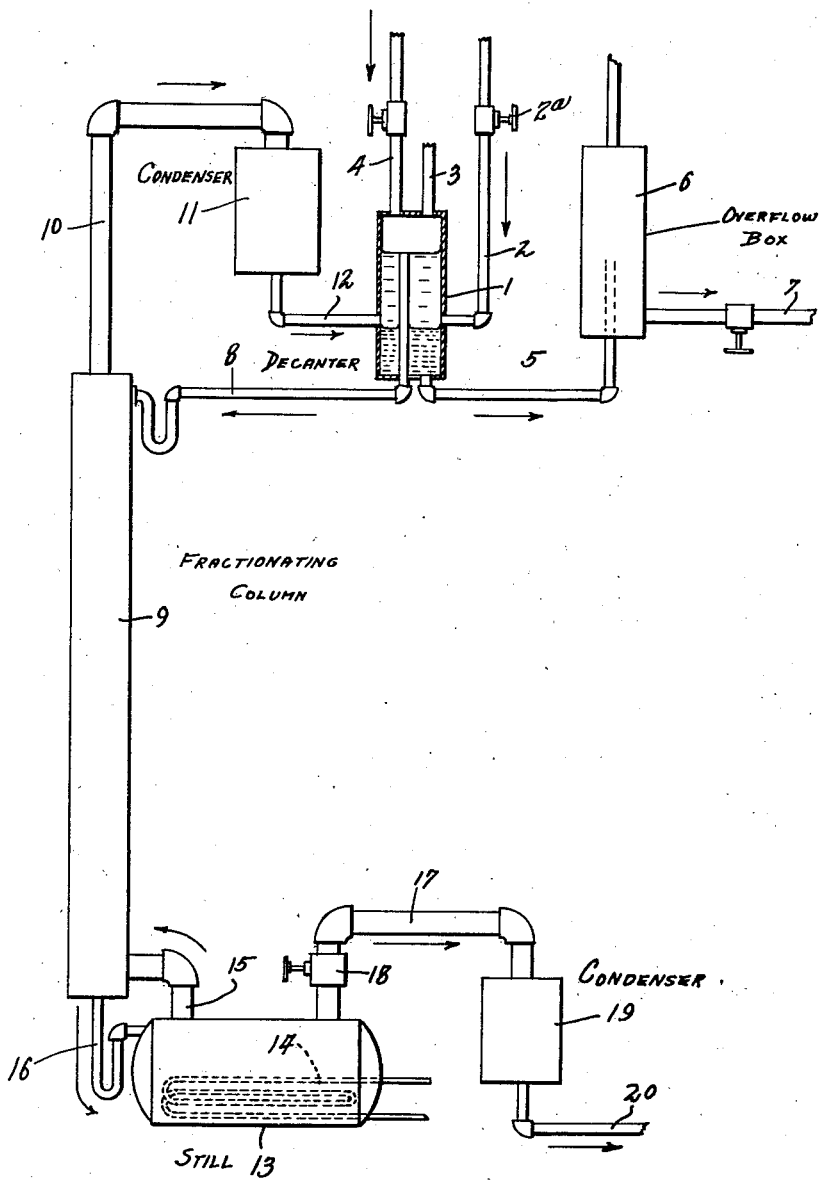

PROCESS FOR AZEOTROPIC DRYING OF MIXTURES OF WATER AND ALCOHOLS OR KETONES

William H. Shiffler and Robert C. Mithoff, Berkeley, Calif., assignors to Standard Oil Company of California, San Francisco, Calif., a corporation of Delaware Application July 6, 1932, Serial No. 621,038

11 Claims. (Cl. 202—42)

This invention relates to a process for dehydrating alcohols and ketones with the aid of a volatile liquid, which is essentially non-miscible with water but miscible in a large proportion with the alcohol or ketone of the mixture. The process has been discovered to have particular value in the dehydration of secondary butyl alcohol, but has also been applied to dehydration of tertiary butyl alcohol and methyl ethyl ketone. It is apparent that it may also be employed for dehydrating other organic liquids, such as isopropyl alcohol.

As is well known, the monohydric alcohols containing three or more carbon atoms per molecule form with water azeotropic mixtures of minimum boiling point, and when the azeotropic mixture is homogeneous, that is, consists of but one liquid layer when condensed, it is not possible to obtain any one of these alcohols containing less than the percentage of water in its azeotropic mixture from the mixture of the alcohol and water by simple distillation, whatever the efficiency of the distilling process, if the starting material contains more water than that in the azeotropic mixture. There is, however, a commercial demand for these alcohols containing less water than that in the azeotropic mixtures. Alcohols containing less water than the azeotropic mixture can be produced by adding to the mixture of alcohol and water a third substance, which is insoluble in water but miscible substantially in all proportions with the alcohol, and distilling off part of the mixture, leaving the dehydrated alcohol in the still. When this ternary mixture is distilled until substantially dry, a dehydrated alcohol is left in the still. It is to a process of this type that the present invention is particularly directed.

In the methods generally employed in dehydrating azeotropic mixtures of alcohol and water through the aid of a third liquid there is employed a column still, condenser, and a reflux decanter, and the alcohol water mixture is fed into the fractionating column of the still somewhere near its middle and the distillate is condensed and run into the reflux decanter, either hot or at room temperature, where stratification occurs, and either part or all of each layer is returned to the column as reflux, the remainders being removed from the system for further treatment. It has been discovered that in such a process, particularly in the case of secondary butyl alcohol, tertiary butyl alcohol and methyl ethyl ketone, marked advantages in yields and heat economies may be secured by feeding the water and organic liquid into the reflux decanter in place of the usual process of feeding the same into the center of the fractionating column of the column still.

According to the present invention, for example, mixtures of water with secondary butyl alcohol are dehydrated through the aid of a volatile liquid (such as petroleum ether), which is essentially nonmiscible with water but miscible in all proportions with the alcohol. The water and alcohol mixture to be dehydrated is delivered to a reflux decanter operated in conjunction with a condenser and fractionating column and still, the apparatus containing a quantity of petroleum ether (or like liquid). Dry alcohol is drawn off at the base of such still and all vapors rising from the fractionating column are condensed to form a liquid consisting of two layers, one such layer containing a greater percentage of water than the other, and there is returned to the still head all of the layer relatively poor in water, which contains that portion of the alcohol feed which when mixed with the condensed vapors remains in such layer, and only part or substantially none of the layer relatively rich in water.

The invention also includes the construction and assembly of an apparatus including means adapted for use in the prescribed method, such as a column still with appropriate heating means, means for totally condensing the vapors rising from the top of the column, means for separating gravitationally the two liquid layers into which the condensate separates, means for introducing the alcohol to be dried in such apparatus as may be used to separate such layers, means for discharging all or a part of one of said layers from the system, means for returning the other of said layers to the still head as reflux along with whatever part of said first layer is not discharged from the system, and means for withdrawing dry alcohol from the still body or base of the column.

The present invention, together with various additional objects and advantages thereof, will best be understood from a description of the preferred form or example of a process and apparatus embodying the invention. For this purpose, we have hereafter described, with reference to the accompanying drawing, a preferred apparatus embodying the invention and a preferred process.

In the drawing, the figure is a diagrammatic view of the apparatus.

Referring to the drawing, 1 indicates a vessel suitable to serve as a reflux decanter, that is to say, it is capable of permitting the condensed material from a fractionating column to gravitationally separate into two distinct layers, as indicated in the figure. 2 indicates a pipe provided with a valve 2ª for feeding an admixture of alcohol and water or ketone and water to the reflux decanter. 3 is a vent pipe leading from the reflux decanter to the atmosphere, and 4 is a pipe for adding petroleum ether or other suitable third liquid to the reflux decanter, as needed. 5 is a pipe connected to a suitable overflow box for continuously withdrawing the lower layer from the reflux decanter 1 and passing it to the overflow box 6, from which a pipe 7 may discharge the lower layer from the apparatus.

8 is an overflow pipe for delivering the upper layer from the reflux decanter 1 to the top of the fractionating column 9 where the upper layer may enter as a reflux liquid. 10 is a pipe for leading the vapors from the top of a fractionating column 9 to a condenser 11, from which a pipe 12 leads the condensed vapors to the reflux decanter 1.

A still 13 is provided with a steam coil 14 or other appropriate means for supplying heat to the liquor contained in the still. The still is also provided with a pipe 15 for leading vapors from the still to the base of the fractionating column 9. There is also provided a pipe 16 for returning the reflux liquid from the fractionating column 9 to the still 13.

The still 13 is further provided with a vapor line 17, having a valve 18, for leading a part of the vapors from the still 13 to a condenser 19, wherein the vapors are condensed and from which the condensed liquid may be passed by a pipe 20 to storage.

A process of dehydrating organic liquids which form azeotropic mixtures with water, in accordance with the present invention as practiced in said apparatus, is as follows:

For example, secondary butyl alcohol containing about 24% of water by volume is fed continuously through the line 2 into the reflux decanter 1, where it meets the condensed vapors from the condenser 11 entering the reflux decanter through the pipe 12. This mixture of liquids separates in the decanter 1 into two layers. The lower one consists of about 13% alcohol, by volume, the remainder being water with traces of petroleum ether, and the upper layer consists of about 50%, by volume, petroleum ether, the rest being secondary butyl alcohol with small amounts of water.

The lower layer or aqueous layer is discharged from the apparatus through the pipe 5, overflow box 6 and pipe 7. The upper or non-aqueous layer is returned through the pipe 8 to the top of the fractionating column 9 as reflux. The vapors from the top of the fractionating column 9 are preferably at a temperature of about 68° C., and are delivered through the pipe 10 to condenser 11, wherein such vapors are condensed and thence delivered through pipe 12 to the reflux decanter 1.

From time to time, as may be needed, petroleum ether is added through the pipe 4 in sufficient quantity to maintain the composition of the upper non-aqueous layer in the reflux decanter 1 at about 50% petroleum ether, by volume. In place of petroleum ether, other volatile liquids insoluble or substantially insoluble in water but miscible with the organic liquid may be used, and as examples of such low boiling point liquids the pentanes, hexanes, heptanes and benzol may be employed.

The process of distillation results in dry or essentially anhydrous secondary butyl alcohol collecting in the bottom of still 13 at a temperature of about 101° C., and by opening valve 18 it may be withdrawn as vapor through pipe 17 and condensed in condenser 19 and passed through pipe 20 to storage. The anhydrous secondary butyl alcohol may be withdrawn continuously or from time to time in the process.

By mixing the alcohol and water mixture first with the condensate from the reflux tower it is possible to separate a part of the water of the mixture immediately in the decanter, so that this water in the alcohol and water mixture is never placed in the distilling apparatus and never reaches the fractionating column itself. In this manner, the process of this invention decreases the work which must be done by the fractionating column itself, thus decreasing the heat requirements of the process as well as decreasing the size of the apparatus necessary, and lowering the initial investment.

The process herein described causes a considerable simplification of the operation of an alcohol dehydration process because the number of factors which must be controlled is decreased. It is only necessary to maintain a certain fixed ratio of reflux liquid to alcohol feed and to maintain the reflux liquid within certain fixed density limits by adding petroleum ether continuously or at intervals to replace losses. Thus, control of only these two factors is sufficient to maintain the dehydration process in continuous and smooth operation.

The regulation of the process may be effected by maintaining the petroleum ether content of the reflux liquid at about 50%, and this may be easily done in practice by maintaining the gravity of the reflux liquid between 55 and 59° A. P. I. at 60° F. through periodically adding petroleum ether.

The ratio of volume of reflux liquid to volume of feed may be maintained at a preferred ratio of five volumes of reflux to one volume of anhydrous alcohol in the feed. However, ratios of six and a half volumes of reflux to one volume of anhydrous alcohol in the feed is satisfactory, and as low as four volumes of reflux to one volume of alcohol may also be used. In addition thereto, somewhat inferior results may be secured by a modified ratio outside of the limits specified.

It will be apparent to those skilled in the art that in the process of bringing the unit into continuous operation, it is desirable to have an excess of petroleum ether in the apparatus at the start and to withdraw it as operation proceeds, until the reflux liquid reaches the composition specified above.

With the process of the present invention, using a 76% secondary butyl alcohol as feed, 95% of the alcohol fed is recovered as anhydrous alcohol. If the feed alcohol and water mixture is more dilute, the yield falls off, reaching about 88% when the feed is 50% alcohol. The remaining alcohol is discharged in the lower layer from the decanter 1, from which it may be subsequently recovered.

A particular feature of value of the present invention is that only a part of the work of the dehydration is done by the fractionating column. For example, assuming 100 gallons of feed consisting of 76 gallons of secondary butyl alcohol and 24 gallons of water and a ratio of reflux to feed of 5 to 1, 9 gallons of water never reach the column. That is, during the process of treating 100 gallons of feed the reflux liquid will deliver only 15 gallons of the water in the feed to the top of the column, the remaining 9 gallons passing out of the system with the second or lower layer of material in the decanter 1 without ever going to the column.

As a further example, if the feed should be 100 gallons of 50% secondary butyl alcohol, 40¼ gallons of water will be discharged in the decanter without ever reaching the fractionating column 9, and only 9¾ gallons must be removed from the alcohol by the action of the fractionating column. As a further example, in a properly operated fractionating column where the ratio of reflux to feed alcohol was decreased to four volumes of reflux to one volume of anhydrous feed alcohol, 14.9 gallons of water were removed from the water alcohol mixture in the decanter and only 9.1 gallons passed to the reflux column. The latter figures are given, assuming the feed to contain 76% alcohol and 24% water. The entire process may under certain circumstances operate under sub-atmospheric or super-atmospheric pressure. Super-atmospheric pressure may have the advantage of facilitating the retention of petroleum ether in the system, while sub-atmospheric pressure may be an advantage when certain high boiling point organic liquids are being handled.

While the particular process and apparatus herein described are well adapted for carrying out objects of the present invention, it is to be understood that various modifications and changes may be made without departing from the principles of the invention, and the invention includes all such modifications and changes as come within the scope of the appended claims.

We claim:

1. A process of dehydrating organic liquids of the alcohol or ketone group, which comprises passing the hydrated organic liquid into a stratifying zone, therein contacting the organic liquid with a mixture of the condensed vapors of the organic liquid, water, and a volatile solvent of the organic liquid which solvent is substantially insoluble in water and thereby forming two separate liquid layers, one relatively rich in water and weak in the organic liquid and the other relatively poor in water and rich in the organic liquid, passing the latter layer to a reflux column, and condensing the vapor from the reflux column to form the condensed mixture utilized in the first step of the process.

2. A process of dehydrating organic liquids of the alcohol or ketone group, containing water, in which the liquid is vaporized in a still connected with a reflux column and where substantially dehydrated organic liquid is returned to the still from the reflux column and in which the vapors from the reflux column are condensed and passed to a stratifying and decanting zone, which process includes passing the organic liquid to be dehydrated into said stratifying and decanting zone before it enters the reflux column.

3. A process of dehydrating organic liquids of the alcohol or ketone group, containing water, in which the liquid is vaporized in a still connected with a reflux column and wherein substantially dehydrated organic liquid is returned to the still from the reflux column and in which the vapors from the reflux column are condensed and passed to a stratifying and decanting zone, which process includes passing the organic liquid to be dehydrated into said stratifying and decanting zone before it enters the reflux column and introducing into the process to form part of the reflux condensate and to form an element of the materials in said stratifying and decanting zone, a volatile solvent of the organic liquid which is essentially non-miscible with water.

4. A process of dehydrating alcohols containing water in a column still with the aid of a liquid miscible with the alcohol but non-miscible with water which includes condensing the vapors from the column of the still and passing the same into a stratifying zone in which they are separated into two liquid layers, returning the alcohol rich layer to the column still, and introducing the alcohol to be dehydrated into the stratifying zone before it enters the column still.

5. A process of dehydrating alcohols containing water in a column still with the aid of a liquid miscible with the alcohol but non-miscible with water which includes condensing the vapors from the column of the still and passing the same into a stratifying zone in which they are separated into two liquid layers, returning the alcohol rich layer to the column still, introducing the alcohol to be dehydrated into the stratifying zone before it enters the column still, and periodically adding sufficient of said liquid miscible with alcohol but not miscible with water in order to maintain nearly constant the concentration of such liquid in the reflux condensate.

6. A process of dehydrating alcohols containing water in a column still with the aid of a liquid miscible with alcohol but non-miscible with water, which includes condensing the vapors from the column and passing the condensate into a stratifying zone wherein it is separated into two liquid layers, passing at least a part of one of said layers which is rich in alcohol into the column as a reflux controlling medium, and adding the alcohol and water mixture to be dehydrated to the stratifying zone so as to separate from the alcohol to be dehydrated a part of its water content before it enters the fractionating column.

7. A process of dehydrating alcohols containing water in a column still with the aid of a liquid miscible with alcohol but non-miscible with water, which includes condensing the vapors from the column and passing the condensate into a stratifying zone wherein it is separated into two liquid layers, passing at least a part of one of said layers which is rich in alcohol into the column as a reflux controlling medium, and adding the alcohol and water mixture to be dehydrated to the stratifying zone so as to separate from the alcohol to be dehydrated a part of its water content before it enters the fractionating column, the ratio of reflux controlling medium to alcohol to be dehydrated entering the process being maintained at between 4 to 1 and 6½ to 1.

8. A process of dehydrating alcohols containing water in a column still with the aid of a liquid miscible with alcohol but non-miscible with water, which includes condensing the vapors from the column and passing the condensate into a stratifying zone wherein it is separated into two liquid layers, passing at least a part of one of said layers which is rich in alcohol into the column as a reflux controlling medium, and adding the alcohol and water mixture to be dehydrated to the stratifying zone so as to separate from the alcohol to be dehydrated a part of its water content before it enters the fractionating column, petroleum ether being utilized as a liquid miscible with alcohol but not miscible with water and the percentage of petroleum ether in the reflux condensate being maintained in the neighborhood of 50%.

9. A process of dehydrating secondary butyl alcohol, containing water, in a column still with the aid of petroleum ether, which includes condensing the vapor from the column still and passing the same into a stratifying zone so as to form two liquid layers one containing most of the petroleum ether and alcohol and relatively little water and the other containing a relatively large amount of water, rejecting from the process the greater part at least of the lower layer and passing the alcohol rich layer to the column still as a reflux controlling medium, and introducing the secondary butyl alcohol to be dehydrated into the stratifying zone before it enters the fractionating column whereby a material part of the water content of the secondary butyl alcohol is rejected from the system without entering the fractionating column.

10. A continuous process of dehydrating alcohols, containing water, in a column still with the aid of a liquid such as petroleum ether which is miscible with alcohol but not miscible with water, which includes passing the vapors from the column through a condenser and into a stratifying zone wherein they are condensed into a layer containing about 50% petroleum ether and the greater part of the remainder of alcohol and into a second layer consisting mainly of water, rejecting the major part at least of the second layer from the process and returning the major part at least of the first layer to the column as a reflux controlling medium, and adding alcohol to be dehydrated to the stratifying zone so that part of its water content is removed before it enters the fractionating column.

11. A process of dehydrating organic liquids of the alcohol or ketone group, containing water, in which the liquid is vaporized in the still connected with the reflux column and wherein substantially dehydrated liquid is returned to the still from the reflux column and in which the vapors from the reflux column are condensed and passed to a stratifying and decanting zone, which process includes separating in such stratifying and decanting zone a layer rich in organic liquid and relatively weak in water from a layer rich in water and relatively weak in the organic liquid, returning a part of the first-mentioned layer at least to the refluxing zone, and contacting the organic liquid to be dehydrated with a part at least of said first-mentioned layer before it enters the reflux column to thereby separate from the organic liquid a part of its water content, whereby a part of the water content of the organic liquid never enters the refluxing zone.

WILLIAM H. SHIFFLER.
ROBERT C. MITHOFF.